United States Patent
Dong et al.

(10) Patent No.: US 9,535,292 B2
(45) Date of Patent: Jan. 3, 2017

(54) SUBSTRATES COMPRISING AT LEAST ONE BLOCKING MEMBER WHEREIN AN INSIDE OF THE AT LEAST ONE BLOCKING MEMBER IS HOLLOW AND UNDER NEGATIVE PRESSURE AND LIQUID CRYSTAL PANEL COMPRISING THE SAME

(71) Applicant: BEIJING BOE OPTOELECTRONICS TECHNOLOGY CO., LTD., Beijing (CN)

(72) Inventors: Tingze Dong, Beijing (CN); Dongsheng Huang, Beijing (CN); Bingyu Chen, Beijing (CN); Qian Zhang, Beijing (CN); Ying Liu, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/079,827

(22) Filed: Nov. 14, 2013

(65) Prior Publication Data
US 2014/0132910 A1    May 15, 2014

(30) Foreign Application Priority Data
Nov. 15, 2012  (CN) .......................... 2012 1 0460933

(51) Int. Cl.
*G02F 1/1339*    (2006.01)

(52) U.S. Cl.
CPC ......... *G02F 1/1339* (2013.01); *G02F 1/13394* (2013.01)

(58) Field of Classification Search
CPC .......................... G02F 1/1339; G02F 1/13394
USPC .................................................. 349/155–157
See application file for complete search history.

(56) References Cited

U.S. PATENT DOCUMENTS

| 8,493,543 B2 * | 7/2013 | Ota .................... G02F 1/136204 349/192 |
| 2005/0041427 A1 | 2/2005 | Esser |
| 2005/0046778 A1 | 3/2005 | Hsiao et al. |
| 2005/0099574 A1 | 5/2005 | Ueyama |

(Continued)

FOREIGN PATENT DOCUMENTS

| CN | 1575395 A | 2/2005 |
| CN | 1940646 A | 4/2007 |

OTHER PUBLICATIONS

First Chinese Office Action Appln. No. 201210460933.X; dated Nov. 26, 2015.

*Primary Examiner* — Paul Lee
(74) *Attorney, Agent, or Firm* — Ladas & Parry LLP

(57) ABSTRACT

A substrate is provided, in a non-display area, with at least blocking member that is used to form at least one enclosed space with negative pressure together with another substrate; in the liquid crystal panel formed by cell assembling of the substrate and the other substrate, the two substrates after cell assembling are tightly bonded together due to the at least one enclosed space formed by the substrates and the at least one blocking member pressed by external atmospheric pressure. The design of the substrate and the liquid crystal panel in the embodiments of the present invention can avoid occurring of mis-alignment of substrates and improve the product yield rate of the liquid crystal panel.

16 Claims, 2 Drawing Sheets

(56) References Cited

U.S. PATENT DOCUMENTS

| | | |
|---|---|---|
| 2005/0122464 A1 | 6/2005 | Lu |
| 2007/0070284 A1 | 3/2007 | Lee et al. |
| 2009/0206334 A1* | 8/2009 | Yoon et al. ............. 257/48 |
| 2009/0218569 A1* | 9/2009 | Fujikawa ............... 257/59 |
| 2011/0058137 A1* | 3/2011 | Huang et al. ........... 349/156 |
| 2012/0224133 A1* | 9/2012 | Makino ............ G02F 1/1339 349/153 |

* cited by examiner

US 9,535,292 B2

SUBSTRATES COMPRISING AT LEAST ONE BLOCKING MEMBER WHEREIN AN INSIDE OF THE AT LEAST ONE BLOCKING MEMBER IS HOLLOW AND UNDER NEGATIVE PRESSURE AND LIQUID CRYSTAL PANEL COMPRISING THE SAME

TECHNICAL FIELD

Embodiments of the present invention relate to a substrate and a liquid crystal panel comprising the substrate.

BACKGROUND

Mis-alignment is a problem of quality mainly confronted by the current liquid crystal panel manufacture, which may result in the occurrence of such undesirable conditions as low contrast ratio and chromatic aberration of the liquid crystal panel. Furthermore, since the detective rate of such phenomenon is quite low, waste of resource is severe.

Currently, for the liquid crystal panel of large size, the liquid crystal (LC) will not diffuse completely after cell assembling and before ultraviolet (UV) treatment. Sufficient vacuum region exists in the display area of the panel such that a frictional force between the post spacer (PS) on the color filter (CF) substrate and the thin film transistor (TFT) on the TFT substrate will be produced due to the external atmospheric pressure effect. The frictional force and the viscous force between uncured sealants of the two substrates will prevent mis-alignment from occurring between the CF substrate and the TFT substrate. But for the commonly used liquid crystal panel of small size, the liquid crystal after cell assembling will immediately diffuse to all regions of the liquid crystal panel. Due to the existence of liquid crystal in the display area of the liquid crystal panel, the frictional force is reduced. In this case, no sufficient frictional force can be provided after cell assembling and before ultraviolet (UV) treatment, so it is easy to result in the problem of mis-alignment of the substrates, so as to lower the product yield rate and image quality of the liquid crystal panel.

SUMMARY

Embodiments of the present invention provide a substrate and a liquid crystal panel comprising the substrate, which can avoid the occurring of mis-alignment of substrates and improve the product yield rate of the liquid crystal panel.

An aspect of the present invention provides a substrate, which comprises a display area and non-display area, wherein the non-display area is provided with at least one blocking member for forming at least one enclosed space with negative pressure with another substrate.

Another aspect of the present invention provides a liquid crystal panel comprising the aforementioned substrate and another substrate.

BRIEF DESCRIPTION OF THE DRAWINGS

The embodiments of the present invention will be described in a detailed way in connection with the accompanying drawings such that those skilled in the art can understand the invention more clearly, in which.

Reference Signs

10—substrate; 11—display area of a substrate; 12—non-display area of a substrate; 13—blocking member; 14—post spacer.

DETAILED DESCRIPTION

In order to make the purposes, technical solutions and advantages of embodiments of the present invention more clear, technical solutions according to the embodiments of the present invention will be described clearly and completely below in conjunction with the accompanying drawings of embodiments of the present invention. It is to be understood that the described embodiments are part of but not all of exemplary embodiments of the present invention. Based on the described exemplary embodiments of the present invention, all other embodiments obtained by those of ordinary skill in the art without creative labor shall fall into the protection scope of the present invention.

Unless otherwise defined, all the technical and scientific terms used herein have the same meanings as commonly understood by one of ordinary skill in the art to which the present invention belongs. The terms "first," "second," etc., which are used in the description and the claims of the present application, are not intended to indicate any sequence, amount or importance, but for distinguishing various components. Also, the terms such as "one," "a/an," or "the" etc., are not intended to limit the amount, but for indicating the existence of at lease one. The terms "comprise/comprising," "include/including," etc., are intended to specify that the elements or the objects stated before these terms encompass the elements or the objects and equivalents thereof listed after these terms, but not preclude other elements or objects. The phrases "connect", "connected", etc., are not intended to define a physical connection or mechanical connection, but may include an electrical connection/coupling, directly or indirectly. "On," "under," and the like are only used to indicate relative position relationship, and when the position of the object which is described is changed, the relative position relationship may be changed accordingly.

Figure 1:
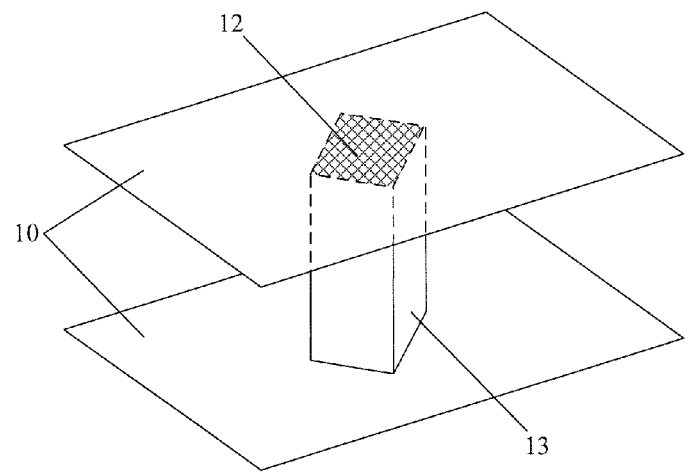
FIG. 1 is a simplified perspective view of a liquid crystal panel in an embodiment of the present invention.

As shown in FIG. 1, the liquid crystal panel comprises two substrates 10, the substrate 10 being provided, in a position of a non-display area 12, among others, with a blocking member 13 that is used to form an enclosed space with negative pressure together with another substrate, such that the two substrates 10 after cell assembling are tightly bonded together because the enclosed space formed by the substrate and the blocking member 13 is pressed by external atmospheric pressure. The frictional force between the two substrates 10 is increased by the additionally provided blocking member 13 compared with that of case having only seal agent frame around the display area, which effectively avoid the occurring of mis-alignment of the two substrates and greatly improves the product yield rate and image quality of the liquid crystal panel.

And, while maintaining the negative pressure inside the blocking member(s) 13, other non-display areas except for the blocking member(s) 13 between the two substrates 10 are communicated with the external environment under normal atmospheric pressure, so as to prevent liquid crystal from perforating out of the seal agent frame, during the transportation of the panel for next process, for example.

Figure 3:
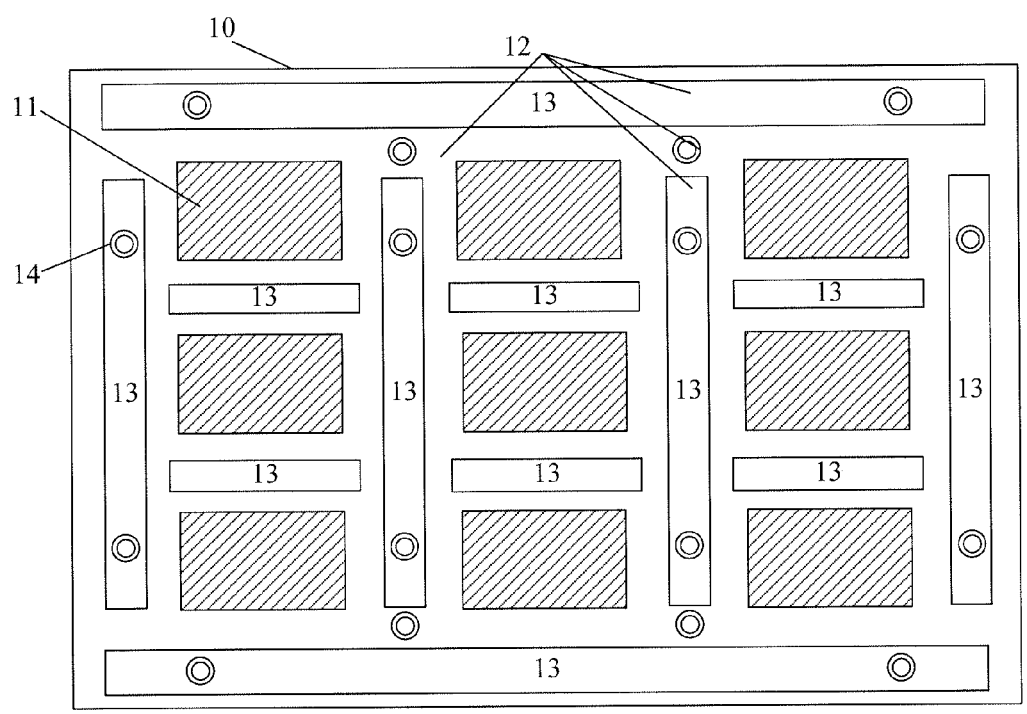
FIG. 3 is a schematic structural view of a liquid crystal panel of another embodiment of the present invention.

In addition, as shown in FIG. 3, between the two substrates 10 of the liquid crystal panel provided by the embodiments of the present invention, post spacer(s) 14 pressing against the two substrates may be provided in the non-display area 12 to further increase the frictional force between the two substrates, which can further avoid the problem of mis-alignment of the two substrates more effectively and improves the product yield rate and image quality of the liquid crystal panel more notably. All of the areas other than the display area 11 on the substrate 10 are the non-display areas 12.

Figure 2:
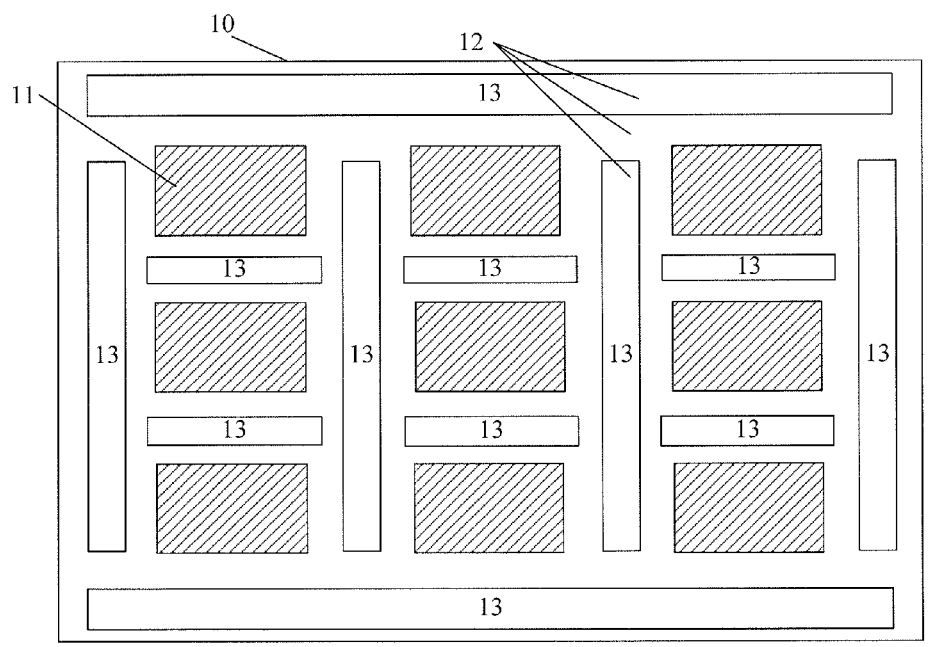
FIG. 2 is a schematic structural view of a liquid crystal panel of one embodiment of the present invention.

According to one embodiment of the present invention, as shown in FIG. 2, the substrate 10 comprises display areas 11 and non-display areas 12 other than the display areas 11, wherein the non-display areas 12 are provided with blocking members 13 that are used to form negative pressure with another substrate. One or more of the blocking members 13 can be provided as needed, and the blocking members 13 are independent from each other. In the liquid crystal panel formed by the two substrates 10 after cell assembling, the non-display areas except for the blocking member(s) 13 are communicated with the external environment under normal atmospheric pressure, so as to prevent liquid crystal perforating out of the seal agent frame, which often happens in a panel with only outer seal agent frame around the display areas, for example.

According to an embodiment of the present invention, the display area 11 of the substrate 10 may comprise a plurality of individual rectangular regions, and each of the rectangular regions may comprise gate lines and data lines intersecting the gate lines, TFTs, pixel transparent electrodes connected to the data lines via the TFTS, a liquid crystal alignment layer covering the pixel transparent electrodes. For example, the display area 11 of the substrate 10 may comprise a plurality of gate lines and a plurality of data lines intersecting the gate lines, a plurality of TFTs disposed at the intersection of the gate lines and the data lines, pixel transparent electrodes connected to the data lines via the TFTs and arranged in a array, and a liquid crystal alignment layer covering the pixel transparent electrodes.

In order to further improve the frictional force between the two substrates 10, the blocking member(s) 13 may not be directly disposed on the substrates 10. Dummy pixels may be firstly disposed on the non-display area 12 of the substrate 10, and then the blocking member(s) 13 is/are disposed on the dummy pixels. Since the dummy pixels can provide greater frictional force, the blocking member(s) 13 can be disposed on the substrate more steadily. Thus, greater frictional force is provided between the two substrates 10, which can avoid the mis-alignment of the two substrates more effectively. In order to easily implement the process, the dummy pixels may be designed to be identical to the pixels in the display area 11, i.e., the size, shape and material of the dummy pixels are designed to be identical to those of the pixel in the display area 11. Alternatively, they may not be identical. For example, for a 4 inch sample, the size of the dummy pixel may be 36 μm*108 μm; or, the dummy pixel(s) may be formed of a metal with same height and shape as those of the pixels in the display area 11. In addition, other materials (e.g. resin materials) that can produce greater frictional force may be used to replace the dummy pixel. The dummy pixel(s) may be disposed on one of the two substrates 10 of a cell, or on both of the two substrates 10 of the cell.

As shown in FIG. 3, the frictional force between the two substrates 10 may be further improved by disposing post spacer(s) 14 between the two substrates 10. The height of the post spacer(s) 14 is designed to be high enough to allow the spacer(s) 14 to press against the two substrates 10. Further more, one or more of the post spacers 14 can be provided. And they may be disposed in the non-display areas of the substrate 10, for example, inside and/or outside the blocking member 13 in the non-display area 12. The post spacer may be a cylinder, for example, with a height of 3.35 μm and a top diameter of 11 μm. The post spacer can also be designed in other shape, such as a cuboid, a prism or the like. And the specific size of the post spacer may be determined according to the practical application.

The blocking member 13 may be designed in a shape of a hollow cylinder, a hollow polygon, a hollow truncated cone or the like. And it may be formed from seal agent or other sealing devices, such as seal ring of rubber or the like, as long as the inside of the blocking member 13 is under negative pressure after the two substrates 10 are assembled to form a cell. In addition, the bigger the region included in the blocking member is, the greater the frictional force is.

The formed negative pressure can be 60%, 40% or less of vacuum or normal atmospheric pressure.

In an embodiment of the present invention, a liquid crystal panel comprises the aforementioned substrate and another substrate, wherein the two substrates after cell assembling are tightly bonded together due to an enclosed space formed by the substrate(s) and the blocking member pressed by external atmospheric pressure.

The substrate in the embodiments of the present invention is provided, in a place of non-display area, with a blocking member that is used to form an enclosed space with negative pressure together with another substrate, such that the two substrates after cell assembling are tightly bonded together because an enclosed space formed by the substrate and the blocking member is pressed by external atmospheric pressure. The frictional force between the two substrates is increased, which effectively avoid the occurring of mis-alignment of the substrates and greatly improves the product yield rate and image quality of the liquid crystal panel.

And, while maintaining the negative pressure inside the blocking member, the non-display areas except for the blocking member(s) between the two substrates are communicated with the external environment under normal atmospheric pressure, so as to prevent liquid crystal perforating out of the seal agent frame during the transportation of the panel for the next process or the like, for example.

In addition, between the two substrates of the liquid crystal panel provided by the embodiments of the present invention, post spacer(s) pressing against the two substrates may be provided in the non-display areas in order to further increase the frictional force between the two substrates, which can further prevent the occurring of mis-alignment of substrates more effectively and improves the product yield rate and image quality of the liquid crystal panel.

The above embodiments of the present invention are only exemplary embodiments and are not intended to limit the protection scope of the present invention.

Without departing from the spirit and scope of the invention, those skilled in the art can contemplate numerous other embodiments, variations and modifications, which shall belong to the protection scope of the present invention.

What is claimed is:

1. A substrate, comprising a display area and a non-display area, wherein the non-display area is provided with at least one blocking member that is used to form at least one enclosed space with negative pressure together ith another substrate; and wherein the at least one blocking member is disposed on a dummy pixel in the non-display area of the substrate, and the dummy pixel is identical to a pixel in the display area of the substrate in height and in shape; and wherein the at least one blocking member has a hollow structure and an inside of the at least one blocking member is under negative pressure.

2. The substrate according to claim 1, wherein the non-display area of the substrate is provided with at least one post spacer, which is in a height to allow it to press against the another substrate.

3. The substrate according to claim 1, wherein the non-display area of the substrate is provided with at least one post spacer, which is in a height to allow it to press against the other substrate.

4. The substrate according to claim 1, wherein the non-display area of the substrate is provided with at least one post spacer, which is in a height to allow it to press against the another substrate.

5. The substrate according to claim 2, wherein the at least one post spacer is disposed inside and/or outside of the at least one blocking member.

6. The substrate according to claim 3, wherein the at least one post spacer is disposed inside and/or outside of the at least one blocking member.

7. The substrate according to claim 4, wherein the at least one post spacer is disposed inside and/or outside of the at least one blocking member.

8. The substrate according to claim 2, wherein the at least one post spacer is in a shape of a cylinder, a cuboid, or a prism.

9. The substrate according to claim 3, wherein the at least one post spacer is in a shape of a cylinder, a cuboid, or a prism.

10. The substrate according to claim 4, wherein the at least one post spacer is in a shape of a cylinder, a cuboid, or a prism.

11. The substrate according to claim 1, wherein the non-display area except for the at least one blocking member between the substrate and the another substrate is communicated with the external environment under normal atmospheric pressure.

12. The substrate according to claim 1, wherein the at least one blocking member is in a shape of a hollow cylinder, a hollow polygon or a hollow truncated cone.

13. The substrate according to claim 1, wherein the at least one blocking member is made of seal agent or a sealing device including a seal ring.

14. A liquid crystal panel, comprising a substrate according to claim 1 and another substrate, wherein the two substrates after cell assembling are tightly bonded together due to the at least one enclosed space formed by the substrates and the at least one blocking member pressed by external atmospheric pressure.

15. The liquid crystal panel according to claim 14, wherein the at least one blocking member is disposed on a dummy pixel or resin material in the non-display area of the substrate and the another substrate.

16. The liquid crystal panel according to claim 14, wherein the non-display area of the substrate and/or the other substrate is provided with at least one post spacer, which is in a height to allow it to press against between the substrate and the another substrate.

* * * * *